(12) United States Patent
Fourney

(10) Patent No.: US 8,205,738 B1
(45) Date of Patent: Jun. 26, 2012

(54) TWO-BELT PASSIVE-ROLLER CASE TURNER

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 13/083,171

(22) Filed: Apr. 8, 2011

(51) Int. Cl.
*B65G 47/24* (2006.01)
(52) U.S. Cl. .................................... 198/415
(58) Field of Classification Search ............... 198/415, 198/817, 850, 853
See application file for complete search history.

(56) References Cited

U.S. PATENT DOCUMENTS

| | | | |
|---|---|---|---|
| 4,676,361 A * | 6/1987 | Heisler .................. | 198/415 |
| 4,747,480 A * | 5/1988 | Wedler et al. ............ | 198/415 |
| 6,923,309 B2 | 8/2005 | Costanzo | |
| 7,007,792 B1 | 3/2006 | Burch | |
| 7,111,722 B2 | 9/2006 | Burch | |
| 7,311,191 B2 * | 12/2007 | Bahr .................... | 198/397.06 |
| 7,703,597 B2 * | 4/2010 | Jansen .................. | 198/415 |
| 7,731,010 B2 | 6/2010 | Kissee et al. | |
| 7,743,905 B2 | 6/2010 | Fourney | |
| 7,793,773 B2 * | 9/2010 | Beck et al. ............. | 198/817 |
| 7,861,849 B2 | 1/2011 | Fourney | |
| 7,896,150 B2 * | 3/2011 | Smalley et al. ......... | 198/415 |
| 8,061,503 B2 * | 11/2011 | Ancarani ............... | 198/415 |
| 2010/0065403 A1 | 3/2010 | Fourney | |

* cited by examiner

*Primary Examiner* — James R Bidwell
(74) *Attorney, Agent, or Firm* — James T. Cronvich

(57) ABSTRACT

A case turner and associated method for rotating conveyed articles. The case turner includes a pair of conveyor belts advancing side by side in a conveying direction. The belts, which are tilted downward toward each other, have rows of article-supporting rollers that can rotate freely on axes parallel to the conveying direction. Each of the belts advances at a different speed so that an article bridging both belts is rotated as it is conveyed along the belt. The speed differential is set to provide a desired degree of rotation for the length of the two belts.

14 Claims, 2 Drawing Sheets

TWO-BELT PASSIVE-ROLLER CASE TURNER

BACKGROUND

The invention relates generally to power-driven conveyors and, more particularly, to belt conveyors and methods for turning cases using conveyor belts with selectively actuated, case-supporting rollers.

Traditional case-turning conveyors use two side-by-side conveyor belts traveling parallel to each other at different speeds. When a package is fed onto and bridges the two belts, the faster belt pulls one side of the package ahead, causing the package to rotate, its leading edge moving toward the slower belt. The package continues to rotate as it is conveyed along the conveyor, finally resting mostly on the slower belt and turned somewhat less than 90°. The package is then plowed into its final orientation and lateral location by a rail extending across the conveyor.

Thus, there is a need for a case turner that can turn packages completely 90° in a short distance without the need for plowing.

SUMMARY

This need and other needs are addressed by a case-turning conveyor embodying features of the invention. One version of such as case turner comprises a first conveyor belt and an adjacent second conveyor belt both advancing in a conveying direction. The first conveyor belt advances at a first speed, and the second conveyor belt advances at a second speed different from the first speed. Both the first and second conveyor belts have article-supporting rollers freely rotatable on axes parallel to the conveying direction. The first conveyor belt defines a first plane, and the second conveyor belt defines a second plane that intersects the first plane at an intersection angle of less than 180°.

Another version of a case turner embodying features of the invention comprises a pair of conveyor belts advancing side by side in a conveying direction. The conveyor belts are tilted downward toward each other. Each of the conveyor belts has article-supporting rollers freely rotatable on axes parallel to the conveying direction. A drive system advances the pair of conveyor belts with a speed differential between each of the conveyor belts.

In another aspect of the invention, a method for rotating a conveyed article comprises: (a) advancing a pair of side-by-side conveyor belts tilted downward toward each other in a conveying direction; (b) conveying an article bridging the pair of side-by-side conveyor belts on article-supporting rollers in the conveyor belts that are freely rotatable on axes parallel to the conveying direction; and (c) advancing the pair of conveyor belts with a speed differential between each of the conveyor belts to cause the article to rotate while being conveyed in the conveying direction.

BRIEF DESCRIPTION OF THE DRAWINGS

These features and aspects of the invention are exemplified in more detail in the following description, appended claims, and accompanying drawings, in which:

DETAILED DESCRIPTION

Figure 1:
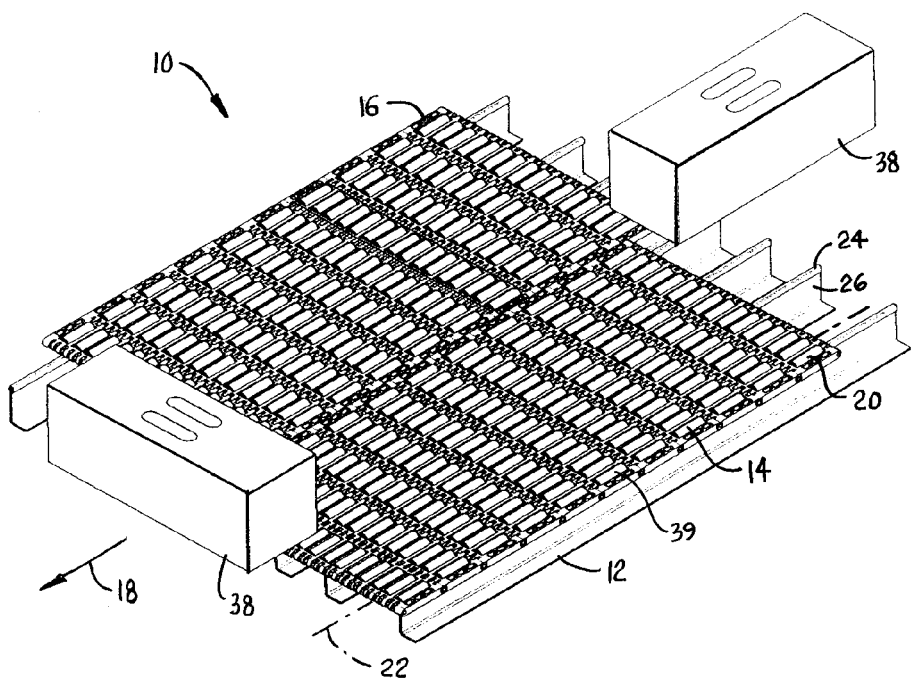
FIG. 1 is an isometric view of a portion of a case-turning conveyor embodying features of the invention.
Figure 2:
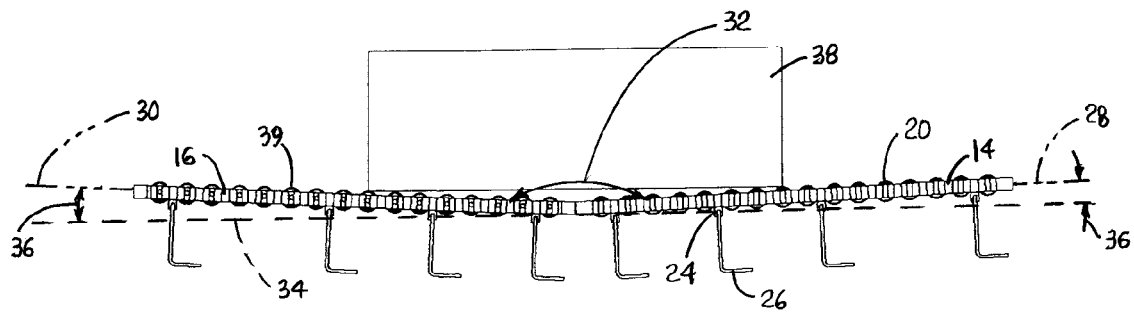
FIG. 2 is a cross sectional view of the case-turning conveyor of FIG. 1 viewed along line 2-2 of FIG. 1.
Figure 3:
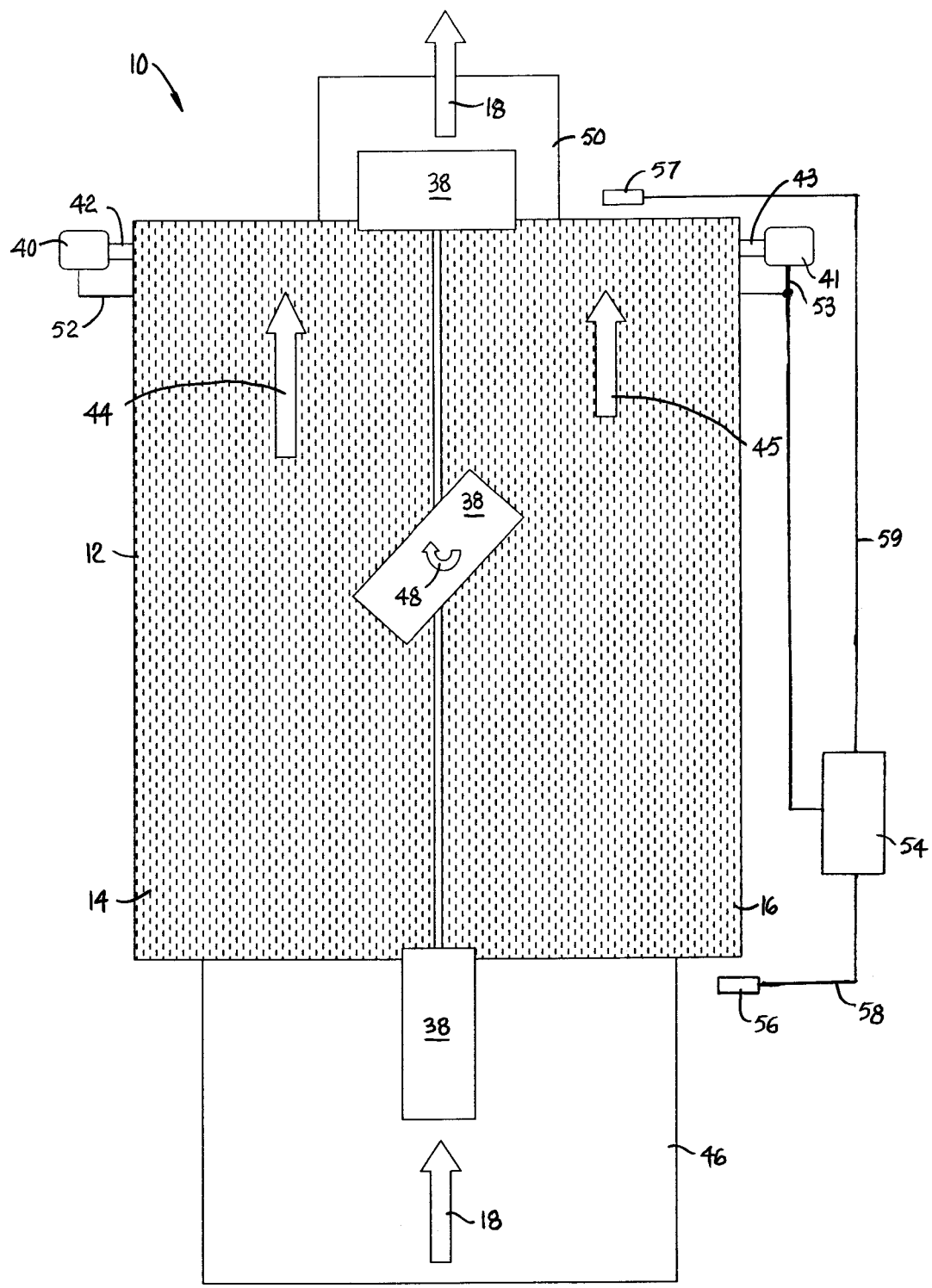
FIG. 3 is a top plan view of the carryway portion of the case-turning conveyor of FIG. 1.

One version of a case-turning conveyor, or a case turner, is shown in FIGS. 1-3. The case turner 10 is shown running along a carryway portion 12 of an endless belt path for which the return is not shown. The case turner includes a pair of conveyor belts 14, 16 advancing side by side in a conveying direction 18. The conveyor belts each have a series of rows of rollers 20 that are freely rotatable on roller axles defining axes of rotation 22 parallel to the conveying direction 18. The rollers are not actively rotated; they operate passively, rotating only by contact with conveyed articles. Each of the belts may be a flat belt, a slat belt, or a pair of roller chains flanking and supporting rollers. Or the belts may be modular plastic conveyor belts, such as the INTRALOX® Series 7000 belt or the INTRALOX® Series 400 TRT belt. The belts abut each other or are separated by a gap along the centerline of the conveyor. The belts are supported on wearstrips 24 mounted atop rails 26. The wearstrips are positioned in spaces between rollers to allow the rollers to rotate freely on their axes without contacting the wearstrips.

The rails 26 increase in height away from the centerline of the conveyor so that the wearstrips 24 support the conveyor belts 14, 16 on the carryway in noncoplanar relationship. Each conveyor belt defines a plane 28, 30 sloped off horizontal. As shown in FIG. 2, the two planes 28, 30 form a V with a vertex, or intersection, angle 32, which is an obtuse angle less than 180°. For example, an intersection angle 32 of between about 176° and about 178° works well. The planes shown also intersect a horizontal plane 34 by a tilt angle 36. For example, tilt angles of between about 1° and about 2° work well.

Articles, such as flat-bottomed cases 38, ride atop the article-supporting rollers 20. As shown in FIG. 2, flat-bottomed articles bridging the two belts 14, 16 are supported only on the edges of the articles owing to the belts' downward tilt toward each other at the centerline. The peripheries 39 of the rollers may have a high-friction characteristic, such as a rough surface or a high-friction surface made of a high-friction rubber, elastomer, or other resilient material, to grip the articles well.

As shown in FIG. 3, the conveyor belts are separately driven by motors 40, 41 driving pulleys or sprockets (not shown) on drive shafts 42, 43. In this example, the left-hand conveyor belt 14 is driven at a higher speed 44 than the lower speed 45 of the right-hand conveyor belt 16. An article 38 is fed onto the two roller-top conveyor belts 14, 16 by an infeed conveyor 46. Because the left-hand conveyor belt 14 is advancing faster than the right-hand belt 16, the article is rotated clockwise about a vertical axis as indicated by the curved arrow 48 as the article is conveyed along the carryway. The freely rotatable rollers facilitate rotation by providing rolling contact with the articles. The differential speed between the two conveyors is set to ensure that the article is rotated 90°, or whatever degree of rotation is desired, as it exits the two conveyor belts 14, 16 onto a downstream conveyor 50.

The lower speed 45 is set to match the overall case rate, i.e., the flow rate of articles on the infeed and downstream conveyors 46, 50. The differential speed, i.e., the difference between the higher speed 44 and the lower speed 45, is set to provide the desired degree of rotation, which depends on the length of the two conveyor belts 14, 16 along the carryway 12. The differential speed may also depend on physical characteristics of the article, such as the shape of its bottom, its weight, and the coefficient of friction between the bottom of the article and the rollers. The speeds of two belts may be set to predetermined speeds based on the desired degree of rotation and the known length of the two belts. But the speeds may be controlled automatically over control lines 52, 53 by a controller 54, which forms part of a drive system with the two motors 40, 41, the shafts 42, 43, and the pulleys or sprockets. The flow rate, the incoming article's orientation, and the exiting article's orientation may be detected by infeed and exit sensors 56, 57, such as optical sensing systems or visioning systems. The sensor signals are sent to the controller 54 over signal lines 58, 59. The controller can use the sensor signals to compute and adjust the speeds of the conveyor belts automatically to match the overall flow rate and achieve the desired degree of article rotation.

What is claimed is:

1. A case turner comprising:
    a first conveyor belt advancing in a conveying direction at a first speed, the first conveyor belt having article-supporting rollers freely rotatable on axes parallel to the conveying direction;
    a second conveyor belt adjacent the first conveyor belt and advancing in the conveying direction at a second speed different from the first speed, the second conveyor belt having article-supporting rollers freely rotatable on axes parallel to the conveying direction;
    wherein the first conveyor belt defines a first plane and the second conveyor belt defines a second plane that intersects the first plane at an intersection angle of less than 180°.

2. A case turner as in claim 1 wherein the intersection angle is between about 176° and about 178°.

3. A case turner as in claim 1 wherein the first plane intersects a horizontal plane at a first tilt angle and the second plane intersects the horizontal plane at a second tilt angle having the same measure as the first tilt angle.

4. A case turner as in claim 3 wherein the first and second tilt angles are between about 1° and about 2°.

5. A case turner as in claim 1 wherein the peripheries of the article-supporting rollers in the first and second conveyor belts have high-friction characteristics.

6. A case turner as in claim 5 wherein the peripheries of the article-supporting rollers in the first and second conveyor belts are made of a rubber or elastomeric material.

7. A case turner comprising:
    a pair of conveyor belts advancing side by side in a conveying direction and tilted downward toward each other, each of the conveyor belts having article-supporting rollers freely rotatable on axes parallel to the conveying direction;
    a drive system advancing the pair of conveyor belts with a speed differential between each of the conveyor belts.

8. A case turner as in claim 7 wherein the peripheries of the article-supporting rollers are made of a high-friction material.

9. A case turner as in claim 7 wherein the drive system sets the speed differential as a function of the length of the pair of conveyor belts.

10. A case turner as in claim 7 wherein the drive system sets the speed differential as a function of physical characteristics of an article being conveyed by the pair of conveyor belts.

11. A case turner as in claim 7 wherein each of the pair of conveyor belts is tilted off horizontal by a tilt angle of between about 1° and about 2°.

12. A method for rotating a conveyed article, comprising:
    advancing a pair of side-by-side conveyor belts tilted downward toward each other in a conveying direction;
    conveying an article bridging the pair of side-by-side conveyor belts on article-supporting rollers in the conveyor belts that are freely rotatable on axes parallel to the conveying direction;
    advancing the pair of conveyor belts with a speed differential between each of the conveyor belts to cause the article to rotate while being conveyed in the conveying direction.

13. The method of claim 12 further comprising setting the speed differential as a function of the length of the pair of side-by-side conveyor belts.

14. The method of claim 12 further comprising setting the speed differential as a function of a physical characteristic of the article.

\* \* \* \* \*